(12) United States Patent
Hartmann et al.

(10) Patent No.: US 7,997,618 B2
(45) Date of Patent: Aug. 16, 2011

(54) REAR FRAME FOR A MOTOR VEHICLE

(75) Inventors: Jens Hartmann, Flörsheim (DE);
Morgan Boerjesson, Uddevalla (SE);
Hans-Joachim Patschicke, Büttelborn (DE); Nico Alexander Diehl, Butzbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/626,084

(22) Filed: Nov. 25, 2009

(65) Prior Publication Data

US 2010/0164214 A1  Jul. 1, 2010

(30) Foreign Application Priority Data

Nov. 27, 2008 (DE) .................. 10 2008 059 274

(51) Int. Cl.
*B62D 21/12* (2006.01)
*B62D 25/08* (2006.01)
(52) U.S. Cl. . 280/785; 280/788; 280/800; 280/124.179; 180/311; 296/193.08; 296/205; 296/203.04
(58) Field of Classification Search ........... 280/124.109, 280/781, 784, 785, 786, 787, 788, 789, 790, 280/791, 792, 793, 794, 795, 796, 797, 798, 280/800, 124.142, 124.147, 124.151, 124.155, 280/124.162, 124.164, 124.179; 180/311; 296/193.01, 193.07, 193.08, 193.09, 198, 296/203.01, 204, 205, 203.02, 203.03, 203.04; B62D 21/12

See application file for complete search history.

(56) References Cited

U.S. PATENT DOCUMENTS

| | | | | |
|---|---|---|---|---|
| 1,547,263 A | * | 7/1925 | Pomeroy | 180/312 |
| 1,565,624 A | * | 12/1925 | Chilton | 180/312 |
| 1,954,078 A | * | 4/1934 | Greig | 280/800 |
| 5,882,039 A | * | 3/1999 | Beckman et al. | 280/781 |
| 6,547,281 B1 | * | 4/2003 | Iwatsuki | 280/785 |
| 7,771,137 B2 | * | 8/2010 | Anzai et al. | 403/379.3 |
| 2002/0163173 A1 | * | 11/2002 | Ruehl et al. | 280/781 |

FOREIGN PATENT DOCUMENTS

| | | |
|---|---|---|
| DE | 3618951 A1 | 12/1987 |
| DE | 102004019750 A1 | 12/2005 |
| DE | 102005050950 A1 | 5/2007 |
| DE | 102005050961 A1 | 5/2007 |
| JP | 2004182189 A * | 7/2004 |

* cited by examiner

*Primary Examiner* — Ruth Ilan
*Assistant Examiner* — Keith Frisby
(74) *Attorney, Agent, or Firm* — Ingrassia Fisher & Lorenz, P.C.

(57) ABSTRACT

A rear frame for a motor vehicle has a profile part manufactured from cast metal. The profile part has two legs, which are connected to one another via a cover element, and an attachment element. In this way, the rear frame has a particularly high stability and may be manufactured particularly cost-effectively.

15 Claims, 8 Drawing Sheets

REAR FRAME FOR A MOTOR VEHICLE

CROSS-REFERENCE TO RELATED APPLICATION

This application claims priority to German Patent Application No. 102008059274.9, filed Nov. 27, 2008, which is incorporated herein by reference in its entirety.

TECHNICAL FIELD

The invention relates to a rear frame for a self-supporting vehicle body of a motor vehicle having a girder and having a profile part of the girder, which has multiple legs, and a vehicle body of a motor vehicle having such a rear frame.

BACKGROUND

In rear frames, the girders are frequently manufactured from sheet-metal profiles and are known from practice. The rear frames are incorporated into a vehicle body comprising sheet-metal shells. To manufacture such girders, a plurality of plates is stamped and deep-drawn. The plates are subsequently connected to one another in a welding method, for example. The number and the concrete configuration of the plates is required in order to ensure the stability of the girder and in particular produce sufficient crash safety of the entire rear frame. In addition, attachment elements are fastened to the girders to attach auxiliary frames or spring struts. The known rear frame thus requires complex manufacturing. Unnecessary material accumulations, which result in an increased weight, arise due to the overlap of the plates required for welding.

Vehicle bodies are also known in which individual node points of the vehicle body comprise cast parts, while the frame parts connecting the nodes are implemented in sheet-metal shell construction. In addition, implementing the front crossbeam of a vehicle body as a cast part is known.

The invention is based on at least the problem of refining a rear frame of the type cited at the beginning so that it is particularly simple to produce and has high stability.

SUMMARY

This problem is solved according to an embodiment of the invention in that the profile part is manufactured from cast metal.

The form of the girder may be selected essentially freely through this design. Furthermore, in a single component, a closed box profile or profiles deviating from a box profile may be generated with little effort. In this way, the rear frame according to an embodiment of the invention is producible particularly cost-effectively. Furthermore, this results in particularly high bending rigidity and torsion rigidity of the rear frame according to an embodiment of the invention. The particularly high rigidity results in high crash safety and driving safety of the motor vehicle having the rear frame according to an embodiment of the invention.

Of course, components to be connected to the profile part may be produced using nearly arbitrary methods. It contributes to further reducing manufacturing costs of the rear frame according to an embodiment of the invention if a cover element, which connects the legs of the profile part, is manufactured from cast metal. The cover element forms a box shape having particularly high bending rigidity together with the profile part through the connection of the legs. For example, the cover element may be welded to the profile part. It contributes to reducing the processing steps for manufacturing the girder, however, if the cover element is integrally cast with the profile part. The profile part and/or the cover element preferably have recesses and/or cross-sectional changes for weight reduction and for targeted influence of the rigidity. Such recesses may be generated easily in the cast metal during the manufacturing in the casting method. No further method step for weight reduction is necessary according to the production method in this way.

According to another embodiment of the invention, it contributes to reducing the manufacturing costs of the girder if an attachment element provided for attaching a further component to the girder is integrally manufactured with the profile part from cast metal. The integral manufacturing of the attachment element contributes to reducing the number of components to be joined to the rear frame according to an embodiment of the invention. During the assembly of the rear frame according to an embodiment of the invention, the further component can simply be moved toward the attachment element and subsequently welded or screwed thereto. The attachment element thus contributes to simplifying the assembly of the rear frame. Furthermore, the girder can be manufactured correctly for the load in a particularly simple manner by an appropriate design of a casting mold for manufacturing the attachment element integrally cast with the profile part. Further reinforcements, as in sheet-metal shell constructions, are not necessary thanks to the embodiments of the invention.

The rear frame according to an embodiment of the invention has a particularly high stability if the attachment element is implemented as an attachment flange for a crossbeam.

The construction effort for introducing operating forces of the motor vehicle into the rear frame according to an embodiment of the invention may be kept particularly low if the attachment element is implemented as a spring plate for supporting a spring element of a rear wheel of the motor vehicle.

According to another advantageous embodiment of the invention, the attachment element contributes to increasing the rigidity of the girder if the attachment element, which is implemented as a spring plate, is made conical and extends over a subarea of the leg.

An auxiliary frame for receiving various components in the rear area of the motor vehicle may be easily installed according to another advantageous embodiment of the invention if the attachment element is implemented as a bearing bush for a rear axle auxiliary frame. A substantial advantage of this design is additionally that the multiple bearing eyes are situated on a common girder. In this case, the integral manufacturing of the components of the girder with the bearing eyes results in a reduction of tolerances, because the bearing eyes are on a common component. The bearing bush can be a bearing eye, a screw bush, or another arbitrarily designed element for attaching the auxiliary frame, for example.

The attachment of the girder to a plate, in particular a side plate or a floor plate of the motor vehicle, is particularly simple according to an advantageous embodiment of the invention if the cover element forms a box shape with a base of the profile part which connects the ends of the legs and if a connection flange is situated on the free ends of at least one of the legs. This connection flange may be generated in the casting method of the profile part and in this way does not require any further processing steps. The connection flange can be angled from the at least one leg or protrude linearly beyond the cover element and allows the simple welding to the plate. The plate preferably connects connection flanges situated on both legs and thus contributes to stiffening the girder.

It contributes to further increasing the stability of the rear frame according to an embodiment of the invention if threaded bolts for screwing the girder to a further component connect the cover element and the profile part to one another. This design is suitable in particular for attaching a rear wheel suspension arm to the girder. This rear wheel suspension arm may be screwed on easily using the threaded bolts.

The rear frame according to an embodiment of the invention has a particularly low weight if the cast metal is a light metal.

The girder of the rear frame according to an embodiment of the invention may be connected easily to adjoining components in a welding method if the cast metal is a cast steel and has a wall thickness of approximately 1 to 5 mm.

At least one object of the invention is also a self-supporting vehicle body, which is manufactured in sheet-metal shell construction, of a motor vehicle having a rear frame, as previously described.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
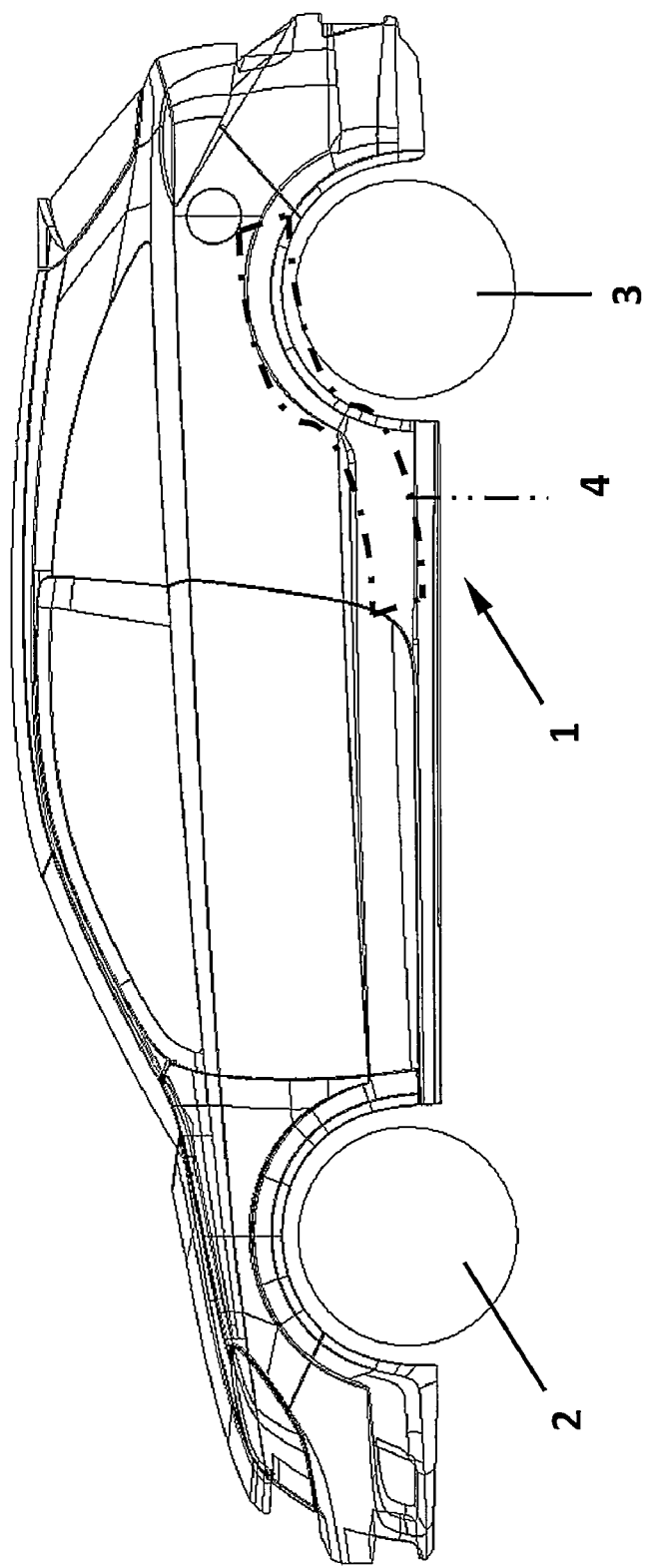
FIG. 1 shows a motor vehicle having a rear frame according to an embodiment of the invention.

FIG. 1 shows a motor vehicle having a motor vehicle body and having a rear frame 1 of the motor vehicle body in a side view. The motor vehicle has two front wheels 2 and two rear wheels 3. The rear wheels 3 are linked to a girder 4 of the rear frame 1.

Figure 2:
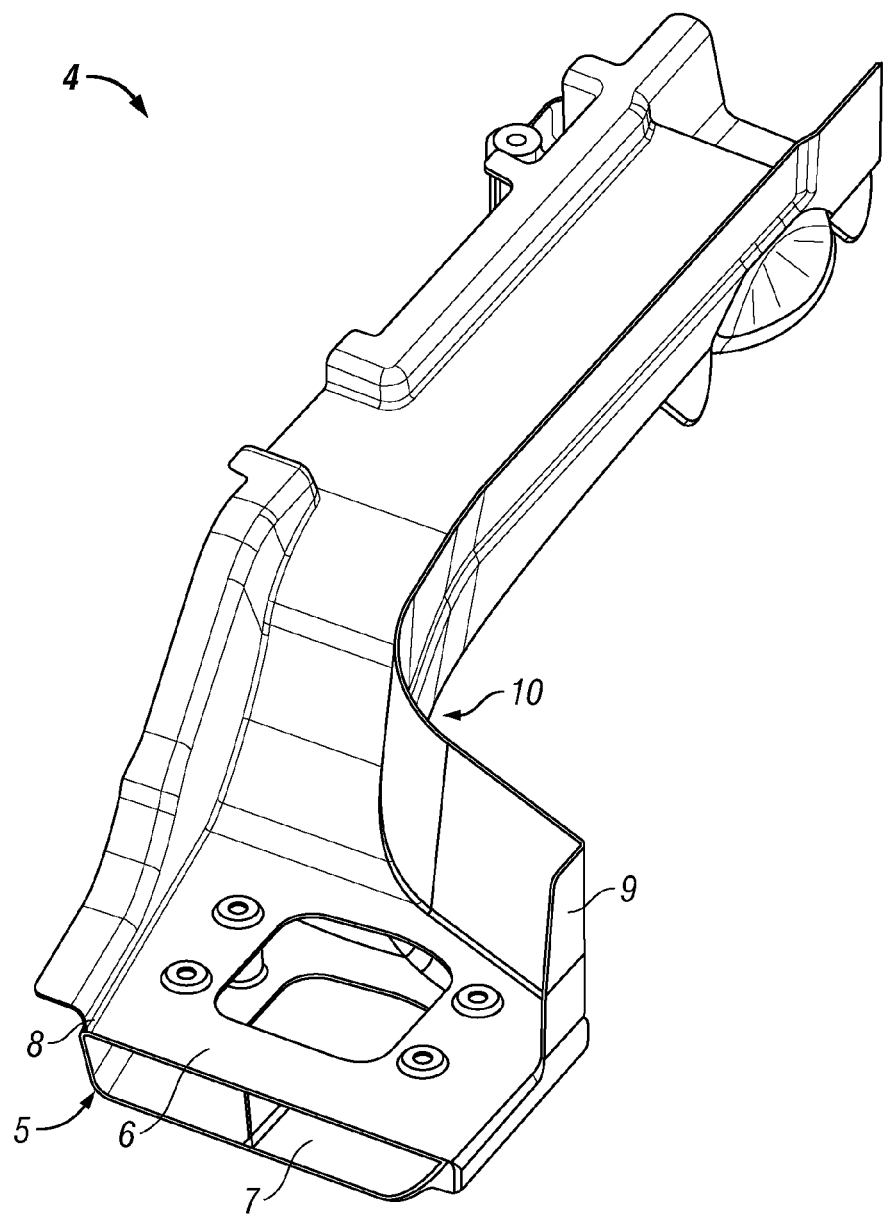
FIGS. 2-4 show multiple embodiments of girders of the rear frame according to an embodiment of the invention from FIG. 1.

FIG. 2 shows a subarea of the girder 4 of the rear frame 1 from FIG. 1 in perspective. The girder 4 has a profile part 5 and a cover element 6. The profile part 5 has a base 7 having legs 8, 9 protruding from the base 7. The cover element 6 connects the legs 8, 9 in a central area. The girder 4 has a bend 10 for guiding it laterally past the rear wheels 3 from FIG. 1 and is manufactured integrally from cast metal.

Figure 3:
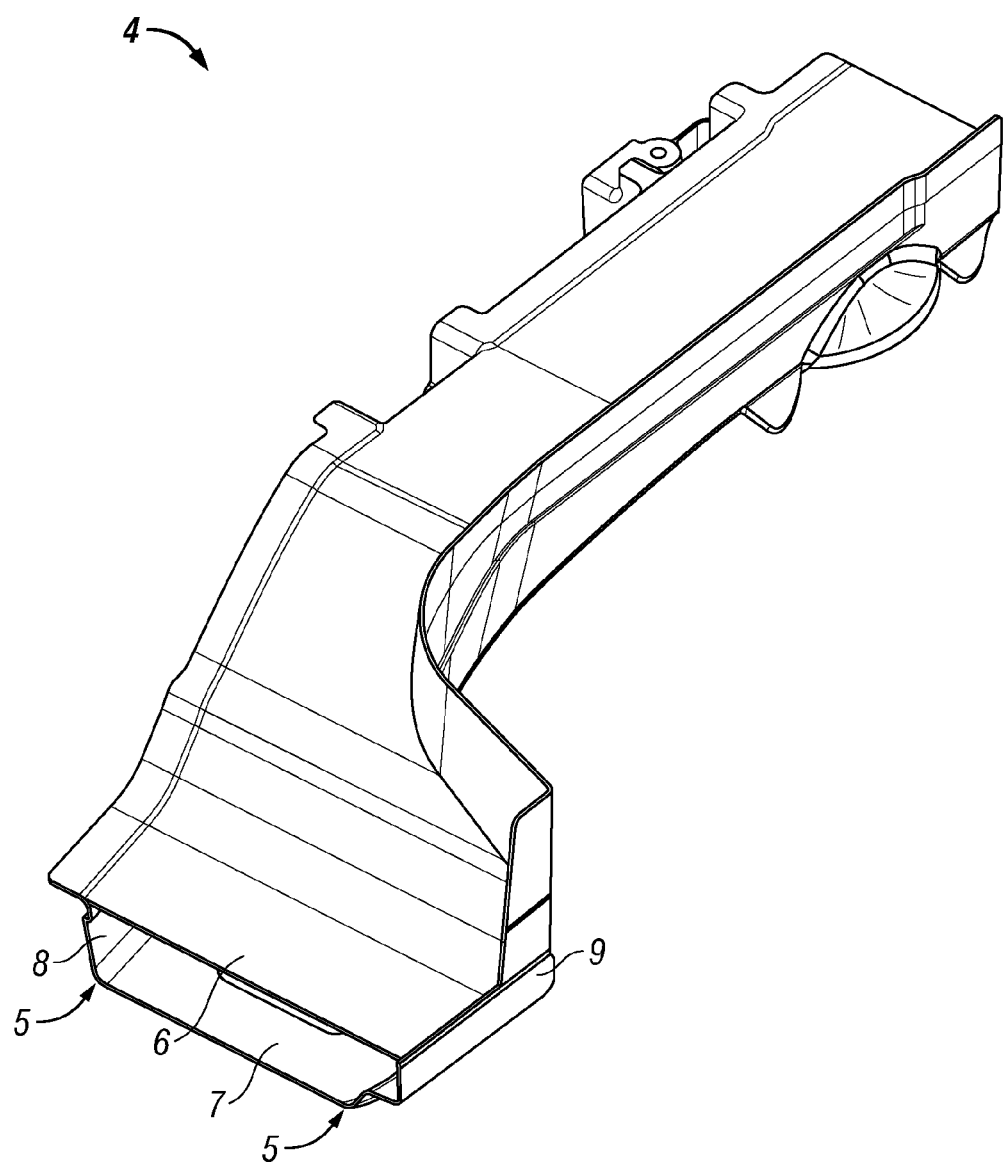

FIG. 3 shows a further embodiment of the girder 4 of the rear frame 1 from FIG. 1 in perspective. It differs from that from FIG. 2 in that the cover element 6 is fastened to the free ends of the legs 8, 9 spaced apart from the base 7 of the profile part 5. Otherwise, the girder 4 is constructed as described in FIG. 2.

Figure 4:
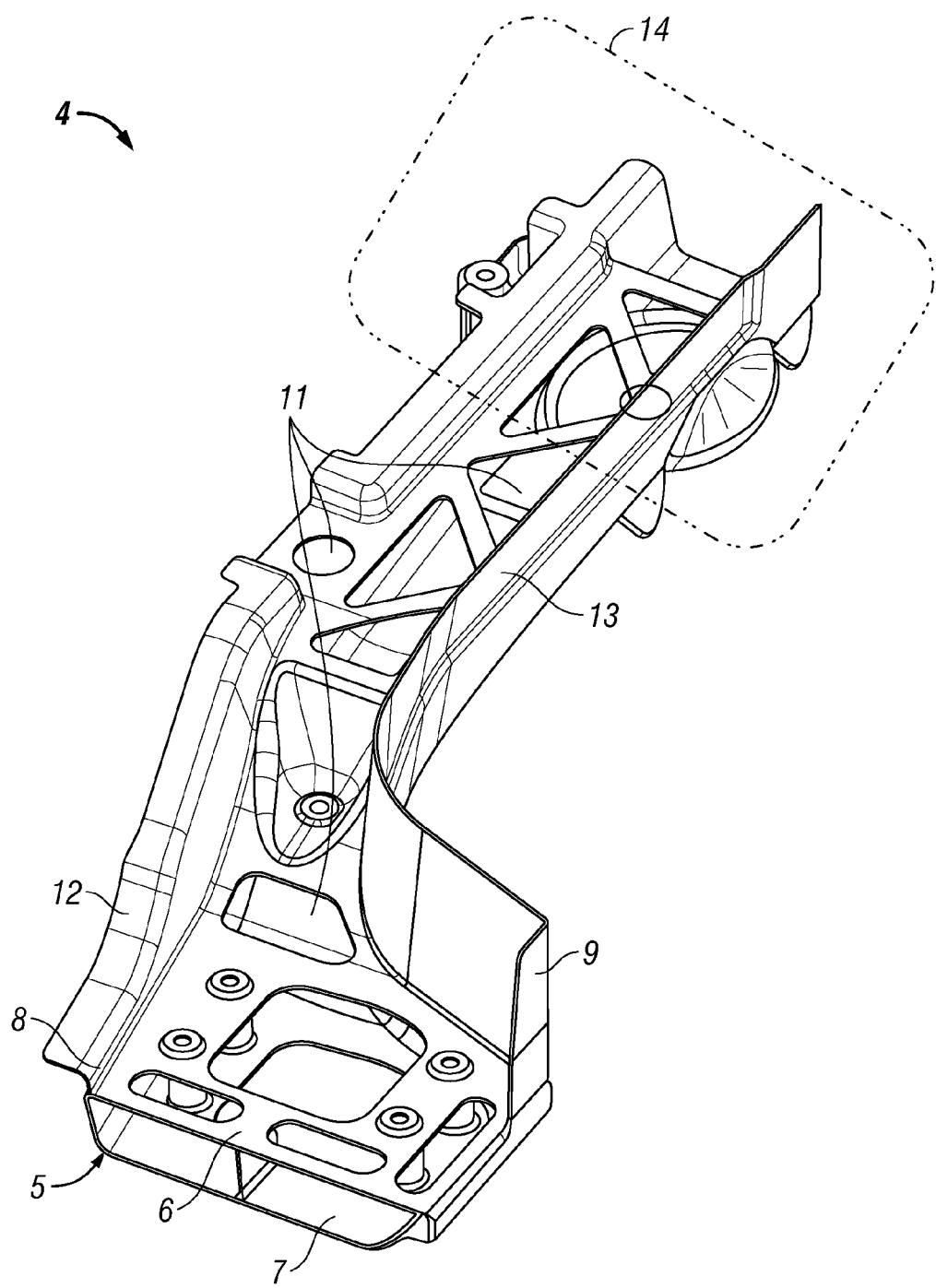

FIG. 4 shows a further embodiment of the girder 4 of the rear frame 1 from FIG. 1 in perspective, having recesses 11 situated in the cover element 6 to save weight. Furthermore, connection flanges 12, 13 are situated on the ends of the legs 8, 9 facing away from the base 7. A plate 14 can be fastened on these connection flanges 12, 13. The plate 14 is shown for exemplary purposes by dot-dash lines here and connects the two connection flanges 12, 13 of the legs 8, 9 to one another. Otherwise, the girder 4 is constructed as described in FIG. 2.

Figure 5:
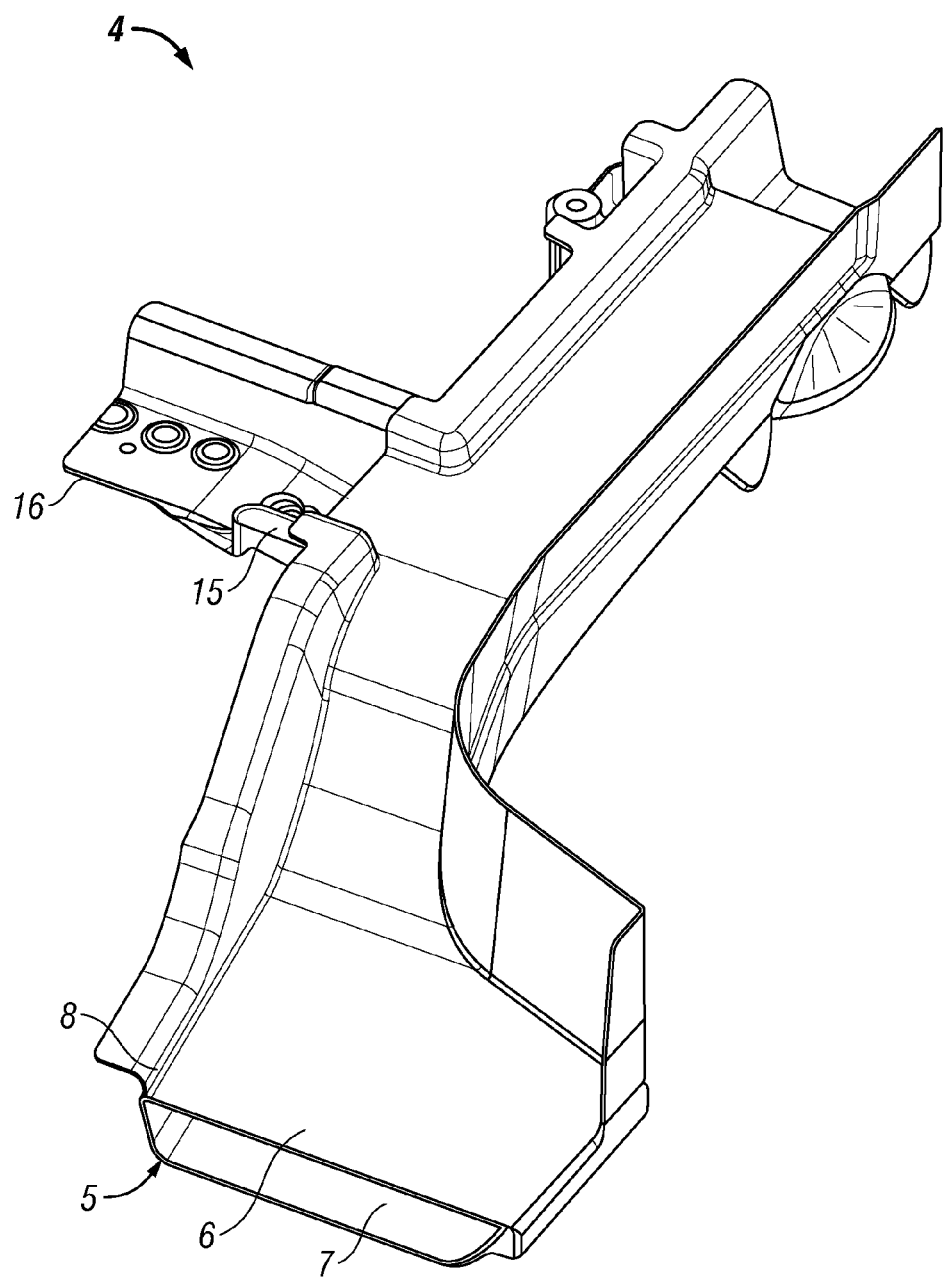
FIG. 5 shows an attachment of a crossbeam to a girder of the rear frame according to an embodiment of the invention from FIG. 1.

FIG. 5 shows the girder 4 of the rear frame 1 from FIG. 1, in which an attachment element 15 is implemented as an attachment flange for attaching a crossbeam 16 and is manufactured integrally with one of the legs 8. The attachment element 15 is situated at the height of the cover element 6, so that the crossbeam 16 is led up into the girder 4. The crossbeam 16 can be constructed like the girder 4 described in FIGS. 2 through 4, of course. The crossbeam 16 is shown schematically by dot-dash lines to simplify the drawing.

Figure 6:
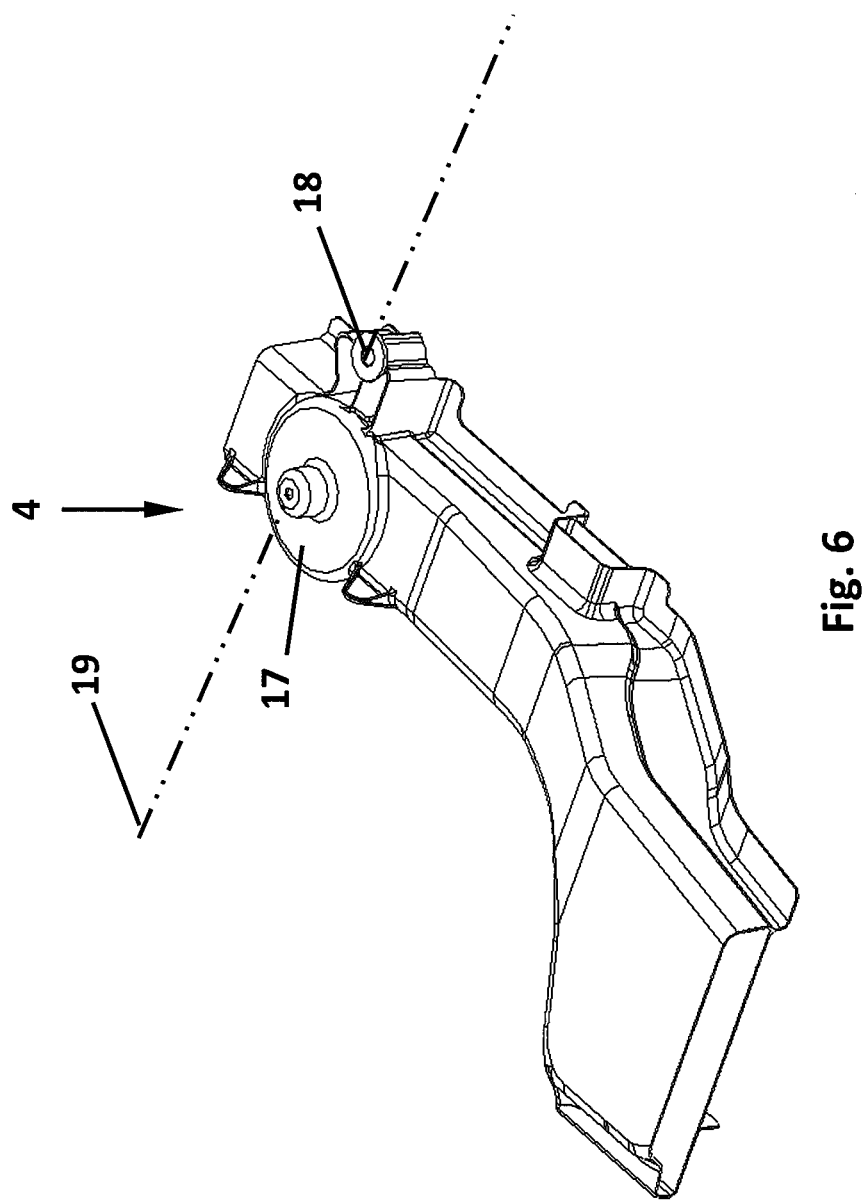
FIG. 6 shows an attachment of an auxiliary frame to a girder of the rear frame according to an embodiment of the invention from FIG. 1.

FIG. 6 shows the girder 4 of the rear frame 1 from FIG. 1, in which multiple attachment elements 17, 18 are implemented as bearing bushes for an auxiliary frame 19. The auxiliary frame 19 connects the attachment elements 17, 18 and is shown very simplified by dot-dash lines in the drawing.

Figure 7:
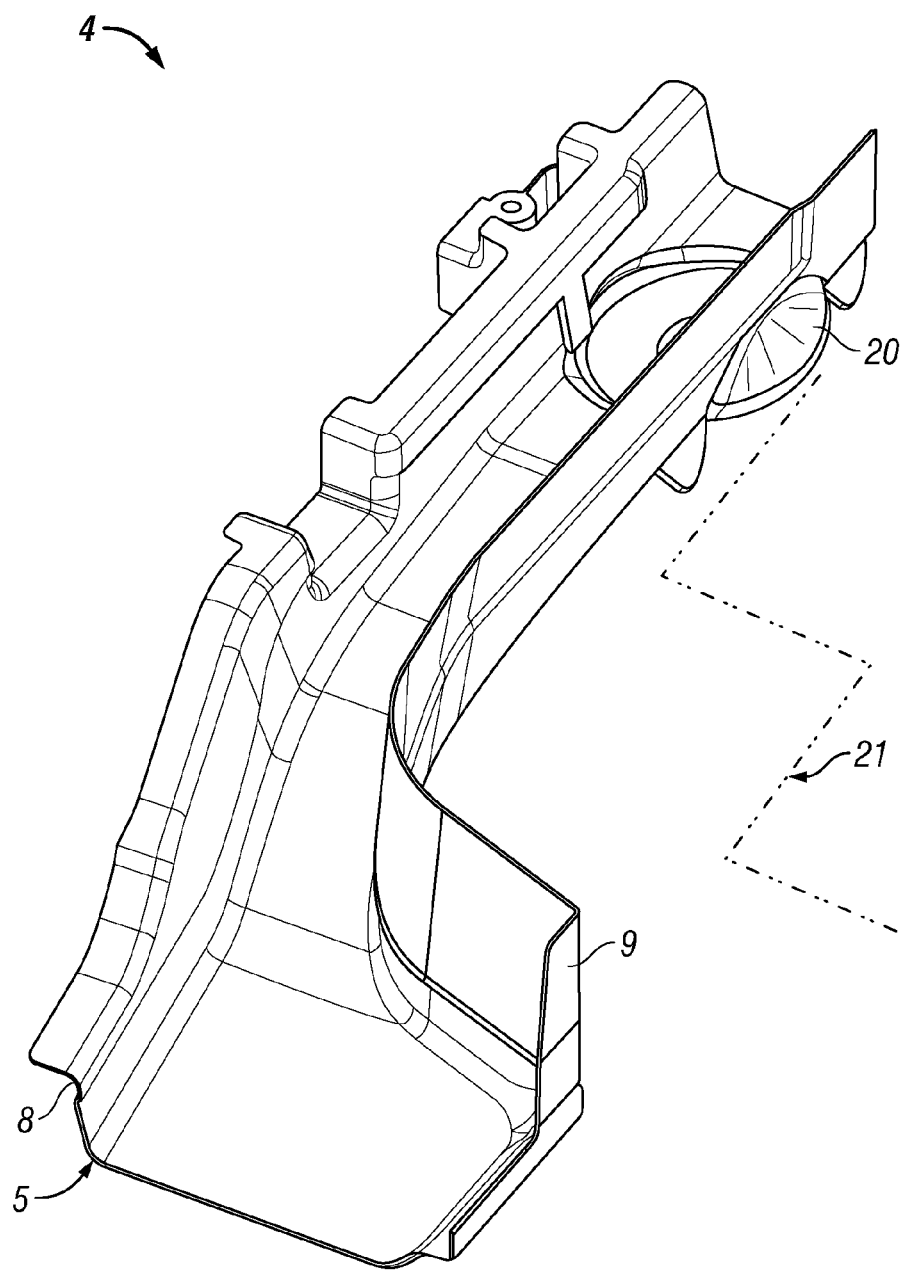
FIG. 7 shows an attachment of a spring element to a girder of the rear frame according to an embodiment of the invention from FIG. 1.

FIG. 7 shows the girder 4 of the rear frame 1 from FIG. 1, in which an attachment element 20 is implemented as a spring plate. A spring element 21, shown by dot-dash lines, for supporting the rear wheels 3 from FIG. 1, is supported on the attachment element 20, which is implemented as a spring plate. The attachment element 20 is shaped conically and is guided over a subarea of the legs 8, 9 of the profile part 5.

Figure 8:
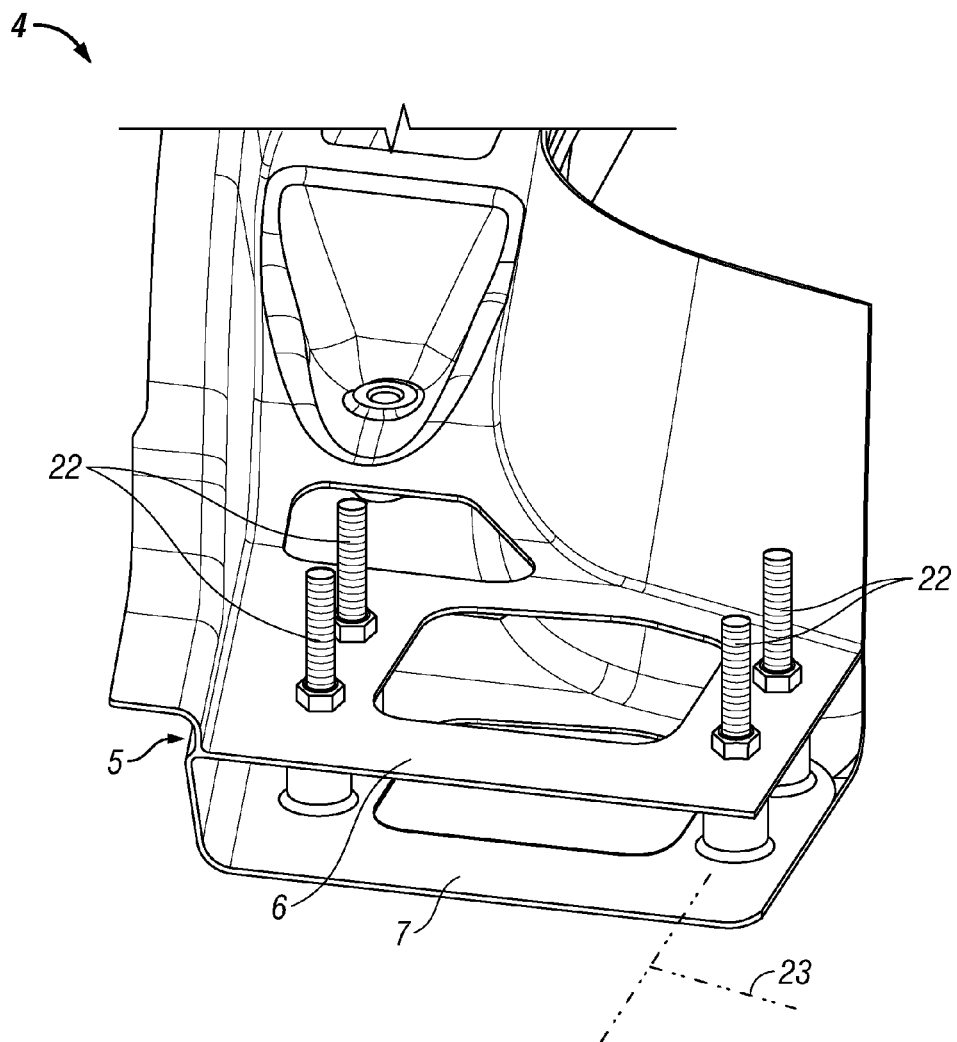
FIG. 8 shows an attachment of a rear axle suspension arm to a girder of the rear frame according to an embodiment of the invention from FIG. 1.

FIG. 8 shows the girder 4 of the rear frame 1 from FIG. 1, in which multiple threaded bolts 22 for attaching a further component 23, shown by dot-dash lines in the drawing, connect the cover element 6 and the base 7 of the profile part 5 to one another.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A rear frame for a self-supporting vehicle body of a motor vehicle, comprising:
   a girder;
   a profile part of the girder comprising a base and a plurality of legs protruding from the base and manufactured from a cast metal;
   an attachment element adapted to attach a component to the girder, wherein the attachment element is integrally manufactured with the profile part from the cast metal;
   wherein the attachment element is a spring plate adapted to support a spring element of a rear wheel of the motor vehicle; and
   wherein the attachment element has a base plate running parallel to the base of the profile part and has an upper extension which is shaped conically and extends over an outer subarea of at least one of the legs.

2. The rear frame according to claim 1, further comprising a cover element that connects the plurality of legs is manufactured from the cast metal.

3. The rear frame according to claim 2, wherein the cover element is integrally cast with the profile part.

4. The rear frame according to claim 2, wherein the cover element forms a box shape with a base of the profile part, which connects the ends of the plurality of legs, and a connection flange is situated on a free end of at least one of the plurality of legs.

5. The rear frame according to claim 2, further comprising a threaded bolt adapted to screw the girder to a further component and connect the cover element and the profile part.

6. The rear frame according to claim 1, wherein the cast metal is a light metal.

7. The rear frame according to claim 1, wherein the cast metal is a cast steel and has a wall thickness of approximately 1 to 5 mm.

8. A self-supporting vehicle body of a motor vehicle, comprising:
- a rear frame for the self supporting vehicle body of the motor vehicle;
- a girder of the motor vehicle;
- a profile part of the girder comprising a base and a plurality of legs protruding from the base and manufactured from a cast metal;
- an attachment element adapted to attach a component to the girder, wherein the attachment element is integrally manufactured with the profile part from the cast metal;
- wherein the attachment element is a spring plate adapted to support a spring element of a rear wheel of the motor vehicle; and
- wherein the attachment element has a base plate running parallel to the base of the profile part and has an upper extension which is shaped conically and extends over an outer subarea of at least one of the legs.

9. The self-supporting vehicle body of the motor vehicle of claim 8, further comprising a cover element that connects the plurality of legs is manufactured from the cast metal.

10. The self-supporting vehicle body of the motor vehicle of claim 9, wherein the cover element is integrally cast with the profile part.

11. The self-supporting vehicle body of the motor vehicle of claim 10, wherein the cover element forms a box shape with a base of the profile part, which connects the ends of the plurality of legs, and a connection flange is situated on a free end of at least one of the plurality of legs.

12. The self-supporting vehicle body of the motor vehicle of claim 8, wherein the attachment element is implemented as an attachment flange for a crossbeam.

13. The self-supporting vehicle body of the motor vehicle of claim 8, further comprising a threaded bolt adapted to screw the girder to a further component and connect the cover element and the profile part.

14. The self-supporting vehicle body of the motor vehicle of claim 8, wherein the cast metal is a light metal.

15. The self-supporting vehicle body of the motor vehicle of claim 8, wherein the cast metal is a cast steel and has a wall thickness of approximately 1 to 5 mm.

* * * * *